United States Patent Office 3,839,447
Patented Oct. 1, 1974

---

3,839,447
AMIDOALKYL BIPHENOLS
Roger T. Swiger, Schenectady, and Jimmy L. Webb,
Jonesville, N.Y., assignors to General Electric Company
No Drawing. Filed June 18, 1973, Ser. No. 370,815
Int. Cl. C07c *103/38*
U.S. Cl. 260—562 P          5 Claims

ABSTRACT OF THE DISCLOSURE

Amidoalkyl biphenols are obtained by the reaction of a dihydroxy biphenol with an amido alkylating agent.

---

This invention is concerned with amidoalkyl biphenols, and a process for preparing the same. More particularly, the invention is concerned with amidoalkyl biphenols corresponding to the general formula

I

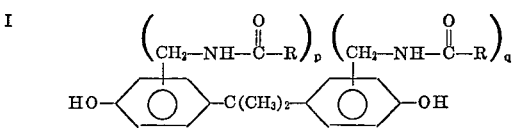

where R is either $CH_3$— or $CH_2=CH$—, $p$ and $q$ are values equal to from 0 to 2, with the proviso that $p$ and $q$ can not be zero at the same time.

It will be noticed that in the generic formula I and in a number of the specific examples which follow, no points of attachment of the amidoalkyl groups to the phenyl nuclei are shown. The reason for this is that it is often difficult to establish where these attachments may occur. Nevertheless, it should be recognized that the attachment of the amidoalkyl groups can be in any one of the positions on the phenyl nuclei containing carbon-bonded hydrogen, and generally permits use of the amidoalkyl biphenols without significant change because of such positioning of the amidoalkyl groups.

The above compositions can be prepared by effecting reaction between 2,2-bis(p-hydroxyphenyl)propane also known as "bisphenol-A" and an amidoalkylating agent have the formula

II

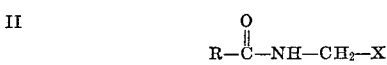

where R has the meaning given above and X is the OH radical or halogen, for instance, chlorine, bromine, fluorine, etc.

In general, depending on the number of amidoalkyl groups it is desired to introduce into the bisphenol-A molecule, up to a maximum of two such groups per phenyl group, one can employ from 1 to 8 or more mols of the amidoalkylating agent per mol of the bisphenol-A. Generally, larger molar equivalents can be employed in order to insure completion of the reaction but, generally, this is not necessary.

The temperature of the reaction is advantageously carried out within the range of from room temperature (about 25 to 30° C.) up to about 100 to 150° C. Obviously, somewhat lower temperatures and even high temperatures than the above range can be used without departing from the scope of the invention; but generally such extreme temperatures are not necessary. Atmospheric pressures are usually adequate, although superatmospheric or even subatmospheric pressures are not precluded.

The reaction is advantageously carried out in the presence of an inert solvent. We have found that lower aliphatic acids, such as acetic acid, propionic acid and other inert solvents, such as dimethylformamide, N-methylpyrrolidone, benzene, etc. can also be employed. The important thing is that the solvent be one which is inert to the reactants and the reaction product, and one in which at least one of the reactants is soluble.

After the reaction is completed, the desired product can be removed by well-known techniques of fractional distillation or recrystallization from suitable solvents.

In order that those skilled in the art may better understand how the present invention may be practiced, the following examples are given by way of illustration and not by way of limitation.

EXAMPLE 1

Into a reaction vessel fitted with stirrer, condenser, and thermometer, were placed 4.56 grams (0.02 mol) bisphenol-A, 12.47 grams (0.14 mol) N-methylolacetamide (prepared by the reaction of acetamide with formaldehyde as shown, e.g., in British Pat. 291,712) and 200 ml. acetic acid. The solution was cooled in an ice bath to 15° C. and then saturated with HCl. The ice bath was removed when HCl saturation was completed. After 22 hours at room temperature with stirring, the reaction solution was diluted with 2000 ml. water, and adjusted to a pH of 4 with 50% aqueous sodium hydroxide. After standing for 72 hours, the white solid which crystallized was collected by filtration and dried at 60° C. under vacuum for 18 hours to give 8.49 grams of the tetra-acetamidomethyl bisphenol-A (83% yield) melting at 249–253° C. corresponding to the formula

III

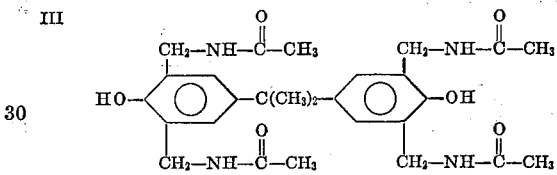

The following analyses, proton nmr, and C-13 nmr established the structure:

|   | Percent | |
|---|---|---|
|   | Found | Calcualted |
| C | 62.5 | 63.25 |
| H | 7.0 | 7.09 |
| N | 10.5 | 10.93 |

EXAMPLE 2

Employing the same reaction vessel as in Example 1, a solution of 1.14 grams (0.005 mol) bisphenol-A, 3.03 grams (0.03 mol) N-methylolacrylamide (which can be prepared by the reaction of acrylamide and formaldehyde in the presence of potassium hydroxide) and 50 ml. acetic acid was cooled in an ice bath and saturated with HCl. The ice bath was removed when HCl saturation was complete, and thereafter the solution was stirred at room temperature for about 3 hours. The reaction solution was diluted with 100 ml. methylene chloride, washed with three 100 ml. portions of water, 100 ml. aqueous 5% NaHCO₃, two more 100 ml. portions of water, dried over magnesium sulfate and filtered. The filtrate was evaporated to yield 1.68 grams (about 61% yield) of a white solid tetra-acrylamidomethyl bisphenol-A having the formula where the positions of the acrylamidomethyl groups were not specifically established:

IV

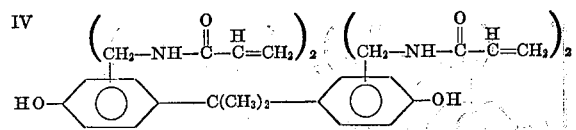

The structure of the compound was established by proton nmr.

EXAMPLE 3

To a reaction vessel similar to that described in Example 1, were placed 4.45 grams (0.044 mol) N-methylolacrylamide and 19 ml. ethanol. To this solution were added 4.57 grams (0.02 mol) bisphenol-A and 1 ml. aqueous 38% HCl. The reaction mixture was heated at reflux temperature for about 90 minutes, cooled to room temperature and poured into 100 ml. chloroform. This solution was washed with two 100 ml. portions of water, dried over magnesium sulfate and filtered. The filtrate was evaporated to yield 5.62 grams of a white solid which was treated to isolate two major products (by colume chromatography) which were identified by means of proton nmr as the mono and diacrylamidomethyl bisphenol-A corresponding to the formulas, respectively, V
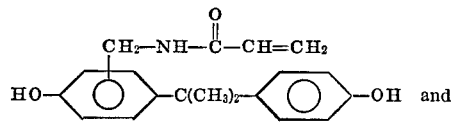

VI
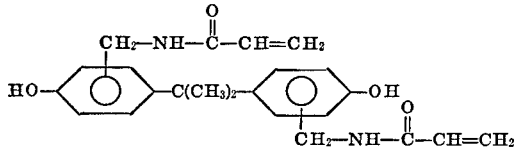

The biphenols for the present invention have many uses. In particular, they can be used as intermediates in the preparation of various polymeric compositions. For instance, the biphenols can be reacted with various acyl halides in accordance with the following equation to form polymers as set forth below.

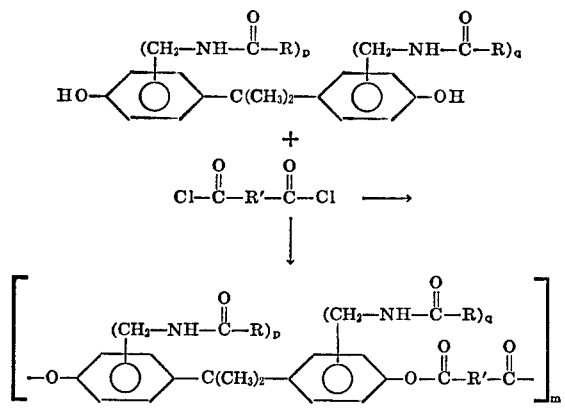

where R, $p$ and $q$ have the meanings given above, R' is a divalent organic radical of from 2 to 20 carbon atoms and $m$ is a whole number greater than 1, for instance, 10 to 1000 or more. Typical of the organic radicals which R' may represent are, for instance, ethylene, propylene, isopropylidene, phenylene, etc.

In addition, the biphenols of the present invention can be reacted with carbonate precursors such as diphenyl carbonate or phosgene, to make polycarbonate resins themselves or the biphenols can be interracted with other biphenols free of amidoalkyl groups to form copolymers of the polycarbonate type by reaction with the diphenyl carbonate or phosgene mentioned above. Depending on the molar concentrations of the amidoalkyl biphenol and the biphenol, such as bisphenol-A, which is coreacted therewith, one can obtain polycarbonate resins containing structural units of the formula

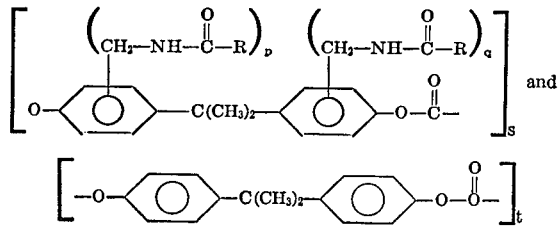 and where R, $p$ and $q$ have the meanings given above, and $s$ and $t$ have values greater than 1, for instance, from 10 to 100 or more.

The above-described polyesters, including polycarbonates, have many uses. Thus, they can be employed as films, molding compounds, coatings, etc. When used as films or when made into molded products, these polymers, including laminated products prepared therefrom, possess good physical properties. Films formed of the polymeric composition of this invention described herein may be used in application where film have been used previously. Thus, the polymeric compositions can be used in automobile applications for decorative or protective purposes as dielectric capacitors, as coil and cable wrappings, for containers and container linings, etc. Various fillers, such as asbestos, wood flour, mica, glass fibers and the like may be incorporated and molded products prepared therefrom.

It has also been found that the incorporation of these amidoalkyl biphenols in other polymers improves certain characteristics of the polymers, particularly the flame resistance and self-extinguishing properties. Thus, a mixture of 37.8 grams of a polycarbonate resin made from bisphenol-A and sold by General Electric Company as Lexan® resin was mixed with 4.20 grams of the tetra-acetamidomethyl bisphenol-A described in Example 1 at 255° C. for 10 minutes in a Banberry Mixer and the mixture compression molded into a sheet 1/16" in thickness. When a portion of this sheet is 1/2" x 5" x 1/16") was held vertically in a 3/4" yellow tipped flame for 10 seconds, and then removed, the sample self-extinguished after 3 seconds. It was then returned immediately to the flame for an additional 10 seconds and upon removal, it self-extinguished after 10 seconds. As an additional improved characteristic, the sample sheet did not drip. When a sample of Lexan polycarbonate resin from which the tetra-acetamidomethyl bisphenol-A compound was omitted, but was tested in the same manner, after the first 10 seconds of burning, the sample self-extinguished after 5 seconds. However, after the second 10 seconds of burning, the sample did not self-extinguish even after 30 seconds. In addition, the sample also dripped. Finally, it was found that the presence of the amidoalkyl biphenol in the polycarbonate resin improved the solvent resistance of the polycarbonate resin in gasoline by a factor of about 10 when tested in accordance with the procedure described in an article by R. L. Bergen in the Society of Plastics Engineering Journal 18, 667 (1962).

In the copending application of one of us, Roger Thomas Swiger, Ser. No. 370,816, filed concurrently herewith and assigned to the same assignee as the present invention, are disclosed and claimed aromatic carbocyclic polymers containing the aforesaid amidoalkyl groups attached to the aromatic nuclei. The presence of such amidoalkyl groups is accomplished by treatment of the polymer, with an amidoalkylating agent having the formula

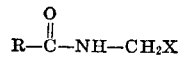

where R has the meaning given above, and X is hydroxyl, or halogen, or an ester group.

What we claim as new and desire to secure by Letters Patent of the United States is:

1. A composition of matter corresponding to the formula

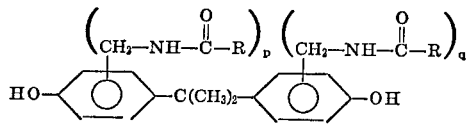

where R is either the methyl group or $CH_2=CH-$ group, $p$ and $q$ are values equal to from 0 to 2, with the proviso that $p$ and $q$ can not be zero at the same time.

2. A compositon of matter having the formula
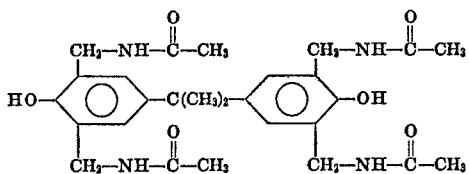
3. A composition having the formula
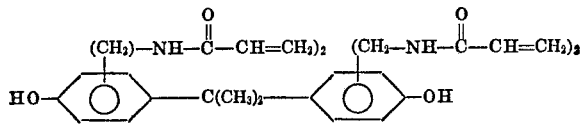
4. A composition having the formula
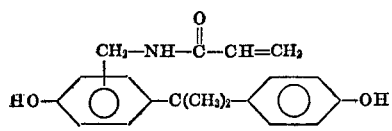
5. A composition having the formula
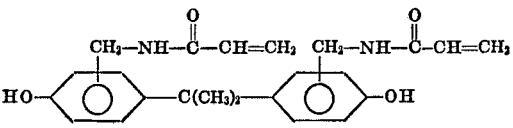
References Cited
UNITED STATES PATENTS
3,555,071   1/1971   Rao et al. _____ 260—562
HARRY I. MOATZ, Primary Examiner
U.S. Cl. X.R.
106—15 FP; 252—8.1; 260—47 UA, 47 XR